Sept. 4, 1934.  W. B. FAGEOL  1,972,333
ELECTRICALLY DRIVEN ROAD VEHICLE AND METHOD OF OPERATING SAME
Filed Oct. 16, 1930  3 Sheets-Sheet 1
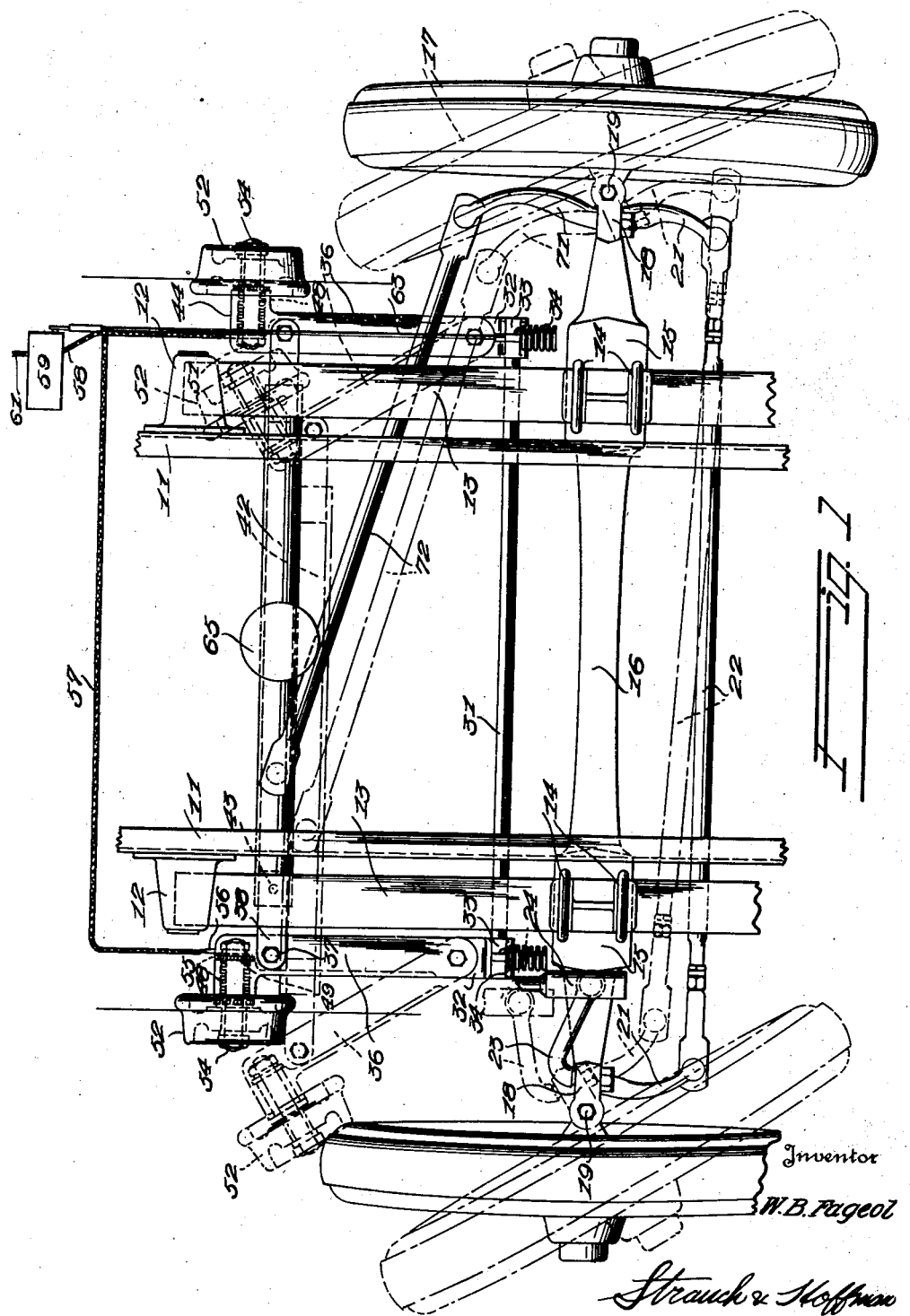
Inventor
W. B. Fageol
Strauch & Hoffman
Attorneys Sept. 4, 1934. W. B. FAGEOL 1,972,333
ELECTRICALLY DRIVEN ROAD VEHICLE AND METHOD OF OPERATING SAME
Filed Oct. 16, 1930 3 Sheets-Sheet 2
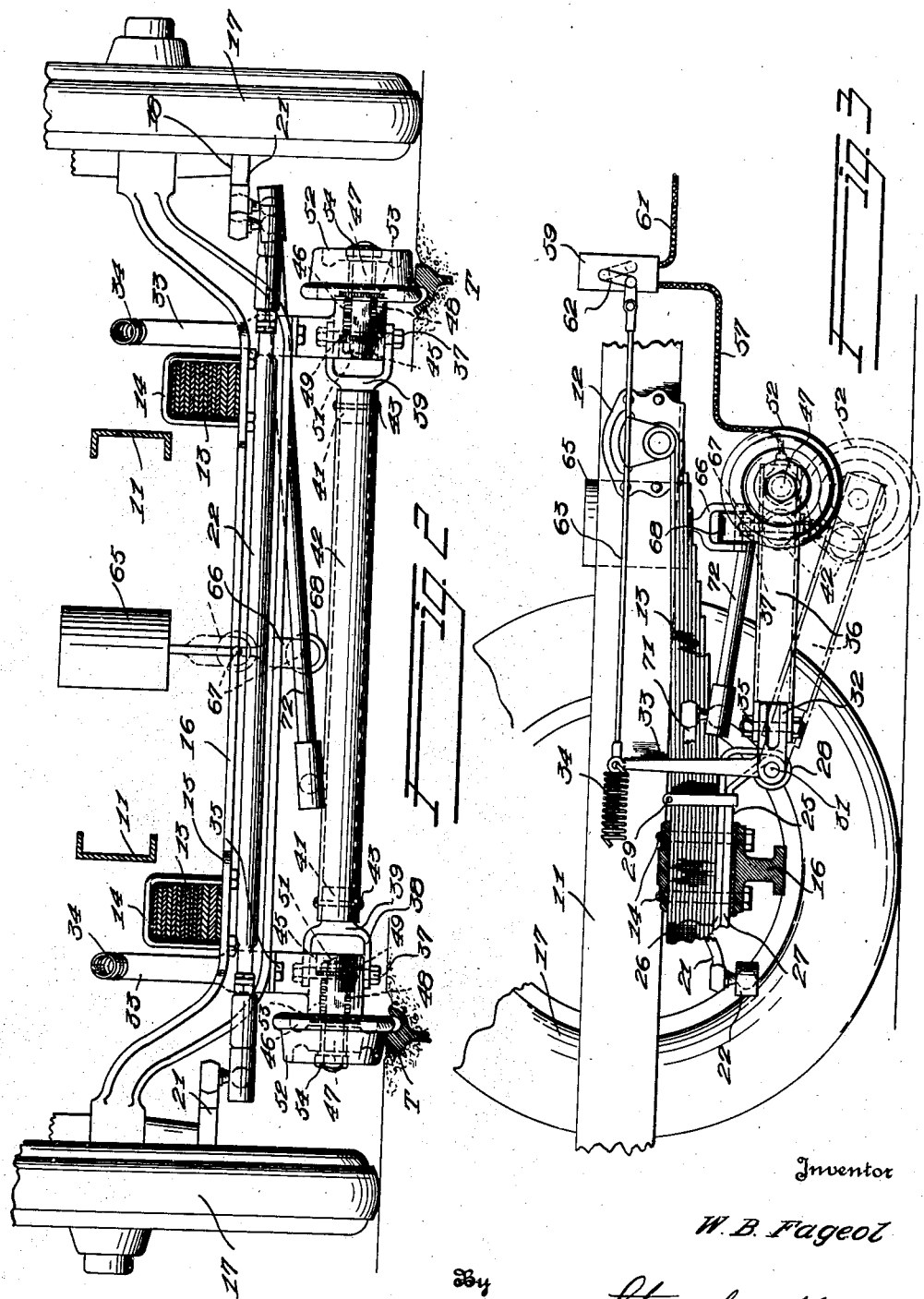
Inventor
W. B. Fageol
By
Strauch & Hoffman
Attorneys Sept. 4, 1934.   W. B. FAGEOL   1,972,333
ELECTRICALLY DRIVEN ROAD VEHICLE AND METHOD OF OPERATING SAME
Filed Oct. 16, 1930   3 Sheets-Sheet 3
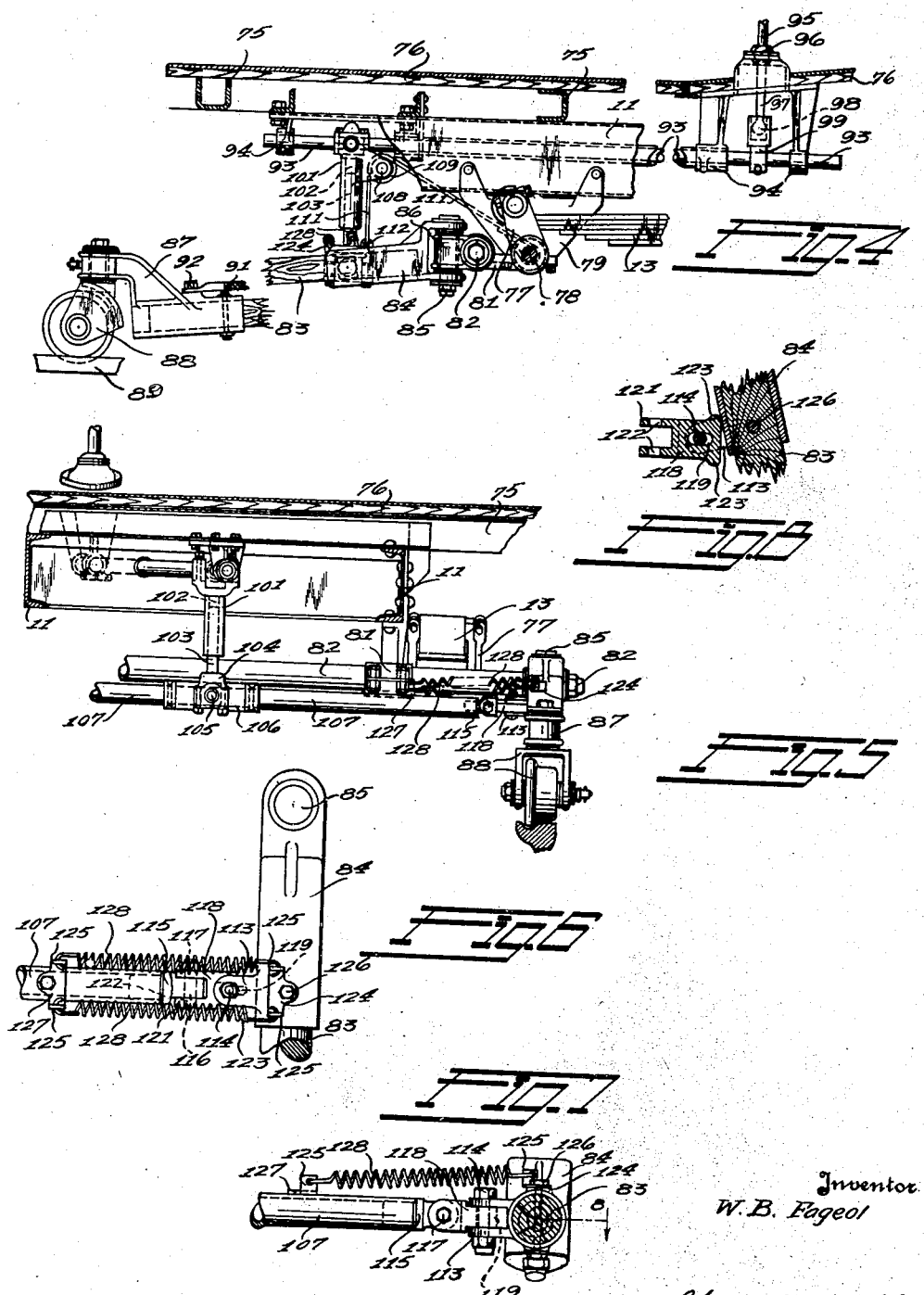
Inventor
W. B. Fageol Patented Sept. 4, 1934

1,972,333

UNITED STATES PATENT OFFICE 1,972,333

ELECTRICALLY DRIVEN ROAD VEHICLE AND METHOD OF OPERATING SAME

William B. Fageol, Kent, Ohio, assignor to Twin Coach Company, Kent, Ohio, a corporation of Delaware Application October 16, 1930, Serial No. 489,208

27 Claims. (Cl. 191—3)

The present invention relates to an electrically driven road vehicle driven from a remote power source and to a method of operating such a vehicle.

More specifically, the invention relates to a novel means and method for association with trackless trolley vehicles for adapting the vehicle to effective operation on existing electric railway tracks by the utilization of the rails solely for current return and, if desired for automatically causing steering movement of the dirigible road engaging vehicle wheels so that the vehicle follows the track though the load is supported on, preferably pneumatic tired, wheels that contact with the road adjacent the rails.

So-called trackless trolley vehicles heretofore proposed, have generally included a return wire arranged in parallelism with and in relatively close proximity to the wire carrying the current to electrically drive the vehicle. This arrangement is generally regarded as satisfactory in rural districts, but its installation in cities or towns is regarded as objectionable, because of the liability of bringing about an inadvertent connection between the supply and adjacently disposed ground wires, as for example during a fire, as an incident to the handling of the fire apparatus, for which reason the rail return is regarded as far more satisfactory for use in cities or towns. On the other hand the wire return, in view of the lesser expense involved in its installation, is regarded as more desirable in unpopulated or thinly populated communities.

Moreover, in cities and towns it is frequently desirable to replace equipment operating upon the rails with the more silently operating and cheaper equipment using road, rather than rail engaging wheels. When such equipment is substituted for the rail cars, it has heretofore generally been the practice to provide an overhead return with the attendant draw-backs to which reference has just been made.

This invention aims to provide a road vehicle of the trackless trolley type, that can be used with equal facility upon roads provided with an overhead wire return, or upon roads in which the rails that have previously been installed for operation of rail cars serve as the ground return and in which the vehicle is capable of being converted from a vehicle operating with an overhead return to a vehicle operating with an underground return in a very simple and expeditious manner.

It has been found that if existing rails are utilized as the return for the electric system, that said rails may likewise be used to automatically control the dirigible wheels ordinarily provided in a road vehicle, so that the operator of the vehicle when he is utilizing the rails as a return may rely upon the rails to steer the vehicle so that its control becomes automatic as in rail car constructions now in common use. It has been found further that when the dirigible wheels are interconnected with the means that engages the rails to effect the steering of the vehicle, as just stated, that such interconnection enables the operator of the vehicle by operating his hand controlled steering mechanism to locate the means in engagement with the rails from the operator's seat, thus greatly facilitating the conversion of the vehicle from a car operating with an overhead return to a car operating with a rail return.

A primary object of the present invention therefore is to provide relatively simple means for operative association with trackless trolley vehicles, whereby such vehicles are adapted for effective operation utilizing either an overhead return wire or existing or specially laid rails as the ground return for the electric motors of such vehicle.

A further object of the invention is to provide means for operative association with trackless trolley vehicles for adapting such vehicles for service on electric railway tracks, the said means being normally held inoperative for operation of the vehicles on roadways provided with an overhead return, said means being adapted for co-operation with the rails of electric railway tracks whereby vehicles equipped therewith may be operated alternately or continuously on such tracks, the said means providing a grounding or electrical return by way of the rails, as well as then automatically accomplishing the steering operation of the vehicle.

A still further object of the invention is to provide a swingingly mounted combined grounding and steering means for ready operative association with electrically connected rails whereby the vehicle is capable of ready conversion from a vehicle operating with overhead return to one operating with a rail return, such means serving, when operating on railway tracks, so that the vehicle will then be automatically steered thereby.

A still further object of the invention is to provide a combined grounding and steering construction for trackless trolley vehicles which comprises rail engaging wheels rotatably journaled on arms pivotally connected for vertical and transverse swinging movement between the dirigible wheels of a vehicle, switch means in the ground conductor between the motors and overhead trolley of said vehicle, ground conductors between said wheels and said switch means, means connecting said wheels with the steering arrangement of said dirigible wheels for steering movement therewith, means normally holding said wheels above track contacting position, means for lowering said wheels into track contacting position, and means operative upon vertical movement of said wheels for operating said switch means for providing grounding through said overhead trolley, when said wheels are in elevated position and grounding through said wheels when in track engaging position.

A further object is that of causing the grounding mechanism to adjust itself automatically, as when the vehicle is rounding curves or is not steered in the true path of the rails, to prevent the grounding wheels from leaving the rails or from assuming a binding or frictional engagement with the latter.

With the above objects in view as well as others that will become apparent during the course of the following disclosure, reference will be had to the accompanying drawings forming part of same and wherein:—

Figure 1 is a broken top plan view showing a front axle and associated dirigible wheels of a trolley vehicle, and disclosing the application of the grounding and steering construction in accordance with a preferred embodiment of my invention.

Figure 2 is a rear elevation, partly in section, of the construction disclosed in Figure 1.

Figure 3 is a right hand side elevation partly in section, of the construction disclosed in Figure 1.

Figure 4 is a view, partly in section and partly in side elevation with portions of certain longitudinal elements broken away, of a modified form of this invention as utilized in connection with a road vehicle.

Figure 5 is a rear elevational view of the structure of Figure 4, as seen when looking toward the left end of the latter.

Figure 6 is a detail view in top plan of a portion of the mechanism of Figures 4 and 5.

Figure 7 is a rear elevational view of the structure of Figure 6.

Figure 8 is a sectional detail taken on the plane of line 8 of Figure 7, with the trailing bar shifted to a position that it will automatically occupy when the vehicle is rounding a curve.

The construction in accordance with the present invention is particularly adapted for operative association with a trackless trolley vehicle comprising a pair of trolleys, one for contact with a current or supply line and the other for contact with a grounding or return line in known manner.

A trackless trolley vehicle is disclosed in the accompanying drawings to an extent only to clearly disclose the application of the present invention; and comprises a relatively light frame 11.

With reference to Figures 1–3 inclusive:

Pivotally secured to brackets 12, rigidly carried by the frame 11, are the front ends of leaf spring assemblies 13 whose intermediate portions are secured by U-bolts 14 to seats or saddles 15 of the front axle 16. The axle 16 is supported by the dirigible wheels 17, which, as in usual practice, are pivotally connected with the opposite ends of the axle 16 through steering knuckles 18 by vertical king pins 19.

The knuckles 18 are provided with rearwardly projecting arms 21 to the free ends of which are universally connected the opposite ends of an adjustable tie rod 22, which provides for simultaneous steering movement of the wheels 17 in known manner.

The knuckle 18, associated with the left wheel 17, is provided with a forwardly projecting arm 23 to the free end of which is universally connected the rear end of a drag link 24 the front end of which is operatively associated with the steering gear in well known manner. The instant invention is operatively associated with the above disclosed construction and comprises a pair of brackets 25, preferably, rigidly secured between the spring 13 and axle 16 by means of U-bolts 14, as is more clearly indicated in Fig. 3. The brackets 25 preferably each comprises a pair of superposed flat plates 26 and 27 of a width equal to that of spring 13 and with the forward ends thereof bent downwardly and provided with nested tubular terminals for providing a shaft bearing 28, as also clearly indicated in Figure 3. The plates 26 and 27 are preferably further maintained in position by U-shaped spring leaf positioning clips 29.

Rotatably journaled in the bearings 28 of brackets 25 is a transversely disposed shaft 31 with the opposite ends thereof projecting laterally outward of the brackets.

Suitably secured to each end of the shaft 31 is a bell crank lever comprising a normally forwardly projecting horizontal arm 32 and a relatively longer vertical arm 33.

Secured to the outer end of each arm 33 is one end of a helical spring 34 whose opposite end is suitably secured to the frame 11.

The springs 34 normally maintain arms 32 substantially horizontal as indicated in Figure 3.

Pivotally connected, as by bolts 35, to the forward ends of arms 32 for transverse pivotal movement are the rear ends of relatively long arms 36, which are, preferably, of channel bar construction as indicated in Figures 1 and 3.

Pivotally connected to the arms 36 adjacent the forward ends thereof, as by vertically disposed bolts 37, are the vertically alined arms 38 of yoke members 39. The yoke members 39 comprise cylindrical portions 41, which are rigidly secured within the opposite ends of a spacing tube 42, as by rivets 43.

The forward ends of arms 36 are provided with laterally outwardly directed hub portions 44, which are provided with inwardly facing recesses 45 extending from the bottoms of bores 46 through the hub portions.

Disposed within each of the bores 46 is a spindle 47. The spindle 47 is of substantially less diameter than bore 46 and a suitable insulating tubular member 48 is disposed within each bore 46 around the respective spindle 47. An insulating washer 49 also surrounds each spindle 47, and is held in engagement with the bottom of the respective recess 45, by means of nut 51 threadedly engaged with the inner end of the spindle for holding the spindle against inward movement.

A flanged rail engaging wheel 52 is rotatably journaled on the outwardly projecting end of each spindle 47. An insulating washer 53 is disposed over spindle 47 between the outer end of hub portion 44, and the inner face of the wheel 52 and a nut 54 is threadedly engaged with the outer end of each spindle 47 for holding wheel 52 rotatably thereon.

Engaged with each spindle 47, between the respective nut 51 and a metallic washer 55 disposed against insulating washer 49 is a metallic clip 56. Secured to clips 56 are the opposite ends of a grounding cable 57 which comprises a branch 58 leading to a switch 59, from which switch leads a cable 61 to the grounding side of overhead trolley.

The switch 59 includes an actuating arm 62 to which is pivotally connected one end of a rod 63 whose opposite end is pivotally connected to the outer end of one of the arms 33.

The wheels 52 are normally maintained out of rail contact by springs 34, as is indicated in Figure 3 at which time the trackless trolley vehicle is operating with an overhead trolley ground or return.

When a vehicle of this character reaches a section of track, as indicated at T in Figure 2, above which is a single current line, and it is desired to operate with the already existing current cable and utilize the track rails as a return as is customary in rail car constructions the return or grounding trolley is pulled down and the wheels 52 are lowered into contact with the rails of track T for providing a ground or current return through the rails.

As the springs 34 normally maintain the wheels 52 in elevated position, as indicated in Figure 3, means are provided for lowering the wheels into rail contact against the effort of the springs 34. Such means preferably comprises a pneumatic cylinder 65 suitably secured to the floor of the vehicle and disposed immediately over the spacing tube 42 and centrally thereof. A suitable piston is reciprocably mounted in the cylinder 65 to which is secured a bracket 66 on which is rotatably journaled, by means of a pintle pin 67, a roller 68.

Air is supplied to the cylinder 65 through a suitable readily accessible valve, whereupon the piston will move the roller 68 downwardly, which, through contact with tube 42 will force the wheels 52 downwardly into rail engaging position upon wheels 52.

When moved downwardly the arms 32 and 36 will be moved to an inclined position, as indicated in Figure 3 and consequently the outer end of the arm 33 will be rocked forwardly thus moving rod 63 forwardly and simultaneously actuating the switch 59 for changing the ground or return from the overhead trolley to the rails through the wheels 52.

The rail engaging wheels 52 will, due to the transverse pivotal connections between the arms 32 and 36, as well as the pivotal connections between arms 36 and the spacing tube 42, follow the parallel rails of the track T both on straight and curved sections thereof, and the dirigible wheels 17 are steered in the usual manner.

The present invention further comprises means for effecting simultaneous steering or turning movement of the dirigible wheels 17 and the rail engaging wheels 52. Such means preferably comprise an arm 71 extending forwardly from the right hand knuckle 18. Universally connected with the free end of the arm 71 is one end of a link 72 whose opposite end has a universal connection with the spacing tube 42, whereby the spacing tube 42 will move laterally upon movement of knuckles 18, so that the arms 36 will always be parallel with the dirigible wheels 17 as is clearly indicated in Figure 1. Consequently the wheels 52 will be maintained parallel with the wheels 17.

In operation of the construction disclosed, the wheels 52 are normally held in elevated position by the springs 34, and the switch operating arm 62 is held by arm 33 through the rod 63 so that the ground or current return is established through the overhead trolley cable. With the parts in this position the vehicle can be operated in usual manner through the double overhead trolley arrangement which as is well known is essential with trackless trolley vehicles in order to provide motor current and a ground or return therefor.

When a track such as the usual overhead trolley street railway tracks is encountered the vehicle can readily be operated thereon by utilizing the overhead current conducting cable for supplying electric energy to the motors, and the rails utilized for a current ground or return, instead of the overhead return cable by bringing the wheels 52 into contact with the track rails.

When it is desired to operate on a track section equipped with an overhead trolley cable, the operator will lose very little time since all that is required is to pull down the overhead return trolley and operate the air valve for actuating the piston in the cylinder 65 and forcing the spacing tube 42 downwardly against the action of the springs 34 through the roller 68 carried by the piston, as indicated by dot and dash lines in Figure 3 until the wheels 52 engage the rails of the track T. Upon downward movement of the wheels 52, levers 33 will be inclined forwardly through the action of the arms 36 and 32 and the switch operating arm 62 will be actuated by the rod 63 for automatically changing the electrical ground or return for the overhead trolley to the wheels 52.

With the parts in this position the vehicle motors will be operated by current from an overhead trolley and having a return through the rails in the same manner as the usual street railway cars. The insulating washers 48, 49 and 53 completely insulate the wheel spindles 47 from the arms 36 thus providing an effective ground connection.

The wheels 52 will be held in uniform pressure engagement with the rails, providing a good contact, and by manipulation of the air regulating valve any desired constant pressure between the wheels and rails can readily be established.

With the wheels 52 in contact with the rails, the wheels 17 are steered in usual manner and by the provision of the connecting link 72 between the spacing tube 42 and the arm 71 of the steering knuckle 18, the wheels 52 will pivot or steer simultaneous with the wheels 17 which permits the operator to move the grounding attachment one way or the other in order to place the wheels 52 in contact with the rails or to re-rail them in case they inadvertently become derailed. This interconnected steering construction further permits the contact wheels 52 to automatically steer the wheels 17 without the aid of the operator through turning the steering wheel.

When it is again desired to operate with the overhead return the air valve is manipulated for releasing the air pressure in the cylinder 65 whereupon the tensioned helical springs 34 will automatically raise the wheels 52 to the position indicated in full lines in Figure 3. Upon placing the return trolley in contact with the overhead return cable the vehicle is ready for further operation.

It is to be particularly noted that as the spacing tube 42 is moved laterally through link 72 upon steering movement of the dirigible wheels 17 both in raised and rail contacting position of the wheels 52, the roller 68 is disposed for rolling contact with the tube 42 longitudinally thereof. It is further to be noted that as cylinder 65 is located a considerable distance from springs 34 a substantial leverage is provided whereby the effort of springs 34 is overcome by substantially little pneumatic pressure in cylinder 65.

It will be seen from the foregoing disclosure that a relatively simple combined steering and grounding attachment for trackless trolley vehicles is provided which is relatively simple in construction and which can readily be attached to existing trackless trolley vehicles operating with an overhead return, whereby such vehicles can be operated on roads provided with an overhead current cable and return cable or on existing current cable equipped railway tracks, thus adapting such vehicles to a much greater range of usefulness at substantially little additional expense.

The entire attachment is relatively light and accordingly will not add much weight to the vehicle construction. By pivoting the construction on the brackets 25 in the manner disclosed and utilizing fluid means to apply the rail wheels the spring deflection will not be impaired. Such fluid means also serves to hold the rail wheels in uniform rail contact with sufficient pressure for providing a good ground connection and for steering the dirigible wheels 17 without substantial liability of derailing said wheels.

In Figures 4-8 there is illustrated a modified form of the present invention. This form is similar to that already described in that it comprises the front end of a pneumatic tired road vehicle having means mounted thereon for cooperation with the ground rails of a street car or railroad track. In this modified embodiment:

The numeral 11 designates the main or longitudinal frame members upon which are mounted some relatively light cross members 75 for supporting the body floor 76. A spring beam 13 is connected at its rear end, by a shackle 77, to a transverse pivot member 78 that is mounted in a frame bracket 79. The bracket 79 is specially designed to have an extension 81 for supporting one end of horizontal and transverse shaft 82. It should be understood that, although only one side of the vehicle is illustrated and Figure 5 is made only sufficiently wide to show a common control mechanism for the grounding devices, both sides of the vehicle and of the grounding apparatus are substantially identical.

The horizontal shaft 82 serves as a pivotal axis for vertical movement of a pair of rearwardly extending wooden bars 83, the pivotal connections being made by setting the forward ends of the bars into cast sockets 84, which sockets are swiveled on vertical pins 85 that connect them with socket elements 86 directly pivoted upon the ends of the cross shaft 82. The bars 83 thus may swing both vertically and transversely relative to the vehicle frame. The rear ends of the bars are set into castings 87 which carry, for swiveling movement about vertical axes, a pair of grounding wheel assemblies 88. These assemblies are of caster design and adapted to run along the ground rails 89. Ground wires 91 are secured, as at 92, to the castings 87 for the purpose of providing a return from the electric motor to the rails by way of the casters. The wooden bars 83 serve to insulate the casters from the vehicle frame.

Mechanism is provided for raising and lowering the grounding wheels, and for causing or permitting them to shift transversely, as follows:

An actuating rod 93 is slidably and rotatably suspended beneath the vehicle floor by a series of frame-carried bracket collars 94. This rod is disposed longitudinally at a small angle with the center line of the vehicle in order that its forward end may project to a position adjacent the driver's seat for operation by a control lever 95. The latter has a universal ball seat 96, and a depending extension 97 that has a conventional ball and recess connection 98 with an arm 99 that is rigidly secured to the rod 93. Hence, as the lever 95 is shifted forwardly or backwardly, manually or by power, the rod 93 will be reciprocated backwardly or forwardly through its supporting collars; and as the lever is shifted laterally in either direction it will cause a corresponding oscillation of the rod 93. Movement of the rod is transmitted to the trailing bars 83 as follows:

Adjacent its rear end the rod 93 has secured thereto a depending arm 101 provided with a longitudinal bore 102. A sliding plunger 103 projects upwardly into the bore, this plunger being connected at its lower end with a bearing member 104 that serves as a pivotal support for a pin 105. The pin 105 forms a part of a sleeve 106 which surrounds the central portion of a transverse steel tube 107. The tube 107 is thus permitted to oscillate about the pin 105 and to rise and fall vertically as a body with the plunger 103.

The arm 101 at its forward side (see Fig. 4) supports a pin 108 upon which is rotatably mounted a pulley wheel 109. A cable 111 passes over the wheel 109. It has one end secured to an eye 112 on the sleeve 106 and its other end fastened around the pin 78. When the rod 93 is reciprocated the distance between pins 78 and 108 is changed and in this manner the sleeve 106, together with the cross tube 107, may be raised or lowered.

The ends of the tube 107 are connected to the trailing bars 83 in such manner that some of the aforedescribed movements of the former will result in corresponding shiftings of the latter, and vice versa. Each of these connections as best shown in Figures 6-8, comprises a flexible and adjustable swivel joint assembly consisting of a fork or clevis 113 integrally formed on the casting 84 and having a vertical hole therethrough for the reception of a bolt 114; a plug 115 set into the end of the tube 107 and having an eye 116 for the reception of a bolt 117; and a connector 118 having an elongated slot 119 through which freely passes the bolt 114, and having a fork 121 with a vertical hole 122 therethrough to receive the bolt 117. The slot 119 is elongated in the direction of the tube 107, and camming ears 123 are formed on the connector 118, for a purpose later to be explained.

A bracket 124, having a pair of upstanding lugs 125, is securely anchored upon the casting 84 by a bolt 126 that passes through the casting, the trailing bar and the bracket body. A similar bracket 127 having lugs 125 is anchored upon the tube 107 in alignment with the first mentioned bracket. The corresponding lugs of the two brackets are interconnected by a pair of coil springs 128, which springs serve to yieldingly draw the casting 84 and its trailing bar 83 inwardly until the body of the bolt 114 is at the inner end of the slot 119.

The mode of operation and the functioning of the above described apparatus is as follows:

Assuming that the vehicle is running along the road without the use of the return rails 89, (i. e., with the control lever 95 thrust forward and latched to hold the grounding wheel assemblies 88 in elevated position above the road surface), and it becomes necessary or desirable to utilize the grounding apparatus,—the driver will steer the vehicle into approximate alignment with the railroad track and then pull the control lever 95 rearwardly to lower the trailing bars and permit the wheel assemblies 88 to ride upon the rails 89. During the dropping movement the lever 95 may be shifted laterally to swing the trailing bars to the left or right a sufficient amount to ensure engagement of the wheels and rails. With the grounding contact established it will be observed that, due to the provision of the several swiveling connections disposed throughout the grounding apparatus, the vehicle may deviate materially from a true course and the vehicle body may assume various positions relative to the track without causing the grounding wheels to jump the rails or to bindingly engage the latter. Of especial importance in this connection is the novel manner in which the ends of the tube 107 are connected to the castings 84.

It frequently happens that the vehicle body is materially out of longitudinal alignment with the center line of the tracks, as when the vehicle is not accurately steered or when it is passing around substantial curves in the track. As a result of this misalignment the grounding wheels would bind or leave the rails unless each wheel and its trailing bar were permitted to move relative to or independently of the other wheel and its bar. It is for automatically permitting this relative movement that the elements 113—128 are provided. The bolt 117 affords a pivot permitting its corresponding trailing bar to partake of a slight movement relative to the common tube 107. The bolt 114 cooperates with the slot 119 to permit the bar 83 to assume angles other than the perpendicular with respect to the connector 118. An illustration of this is given in Figure 8 wherein, as the vehicle is rounding a curve, the casting 84 has moved angularly by rocking about one of the camming ears 123. This movement was permitted by the slot 119 and the yielding springs 128. The latter are sufficiently strong, however, to maintain the casting 84 in engagement with some portion of the connector 118 at all times. The caster effect of the wheel assembly 88 cooperates with the feature just described to further reduce the possibility of wheel binding or jumping.

From the above it will be seen that I have provided a practical and commercially feasible grounding apparatus that will maintain an unbroken electrical circuit regardless of inaccurate steering, sharp curves in the track, improper relative rail elevation, irregularities in the rail surfaces and uneven load distribution.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desire to secure by United States Letters Patent is:—

1. A road vehicle of the type that is designed to be electrically driven from a remote source of energy and embodying dirigible road engaging wheels and steering mechanism to manually control said mechanism, means including a rail engaging wheel connected to said steering mechanism and arranged for selective engagement with a rail designed to act as an electric return and a normally open switch in the return circuit of the electric driving means, said switch being mechanically connected to said first named means so as to be closed when said wheel is brought in contact with said rail.

2. In combination with a trackless trolley vehicle provided with dirigible wheels and designed for operation with an overhead return cable; of an attachment supported by said vehicle for further adapting same for operation on railway tracks provided with single overhead current conducting cables; said attachment comprising rail engaging wheels, switch means in the electrical return connections, means normally holding said wheels in elevated position; means for moving said wheels into rail engaging position; and means operative upon movement of said wheels for operating said switch means for effecting electrical return through said rail.

3. The combination defined in claim 2 in which said rail engaging wheels are operatively connected with the steering arrangement of said dirigible wheels of said vehicle for effecting simultaneous steering movement of said rail engaging wheels and said dirigible wheels.

4. An attachment for trackless trolley road vehicles utilizing an overhead return for adapting such vehicle for effective operation on electric railway tracks by the utilization of the track rails, for a return, said attachment comprising rail engaging wheels adapted for pivotal connection with the frame of a trackless trolley vehicle; means normally maintaining said wheels out of track engaging position; and means operative upon movement of said wheels for effecting return through the overhead trolley of said vehicle when said wheels are out of track engaging position and through said wheels when same are in track engaging position.

5. The construction defined in claim 4 in which said attachment further comprises means for connecting said track engaging wheels with the vehicle steering wheels for simultaneous steering movement of said rail engaging wheels and said vehicle steering wheels.

6. In combination with a trackless trolley road vehicle provided with an overhead trolley return, of an attachment removably secured to said vehicle for adapting same for operation on existing electric railway tracks; said attachment comprising a pair of rail contacting wheels pivotally connected with said vehicle for movement vertically and laterally relative thereto; means associated with said vehicle and said wheels for normally holding said wheels in vertically elevated position; means supported by said vehicle for moving said wheels vertically downward into track engaging position; and means operative upon downward vertical movement of said wheels for shifting the return from said overhead trolley to said rails.

7. The combination defined in claim 6 in which said attachment further comprises means for operatively connecting said rail contacting wheels with the steering mechanism of the dirigible wheels of said vehicle for simultaneous steering movement of said rail contacting wheels and said dirigible wheels.

8. In combination with a trackless trolley road vehicle provided with an overhead trolley return, of a grounding and steering attachment for said vehicle adapting same for operation on electric railway tracks by the utilization of the rails thereof for return; said attachment comprising a transversely disposed rotatable shaft supported by said vehicle; a pair of arms secured to said shaft for vertical swinging movement; said arms embodying pivotal connections for transverse swinging movement of portions thereof; rail engaging wheels rotatably journaled on said transversely swinging portions of said arms; means cooperating with said vehicle and said arms for normally holding said arms substantially horizontal with said wheels in elevated non-rail engaging position; means for forcing said wheels into rail engaging position against the action of said last means; switch means in the return circuit between the overhead trolley and motor of said vehicle; return circuits between said wheels and said switch means; and means operatively connected with said arms for operating said switch means upon movement of said wheels to rail engaging position for establishing a return through said rails.

9. The combination defined in claim 8 in which said wheels are operatively connected with the dirigible wheels of said vehicle for simultaneous steering movement therewith.

10. The combination defined in claim 8 in which said arms are interconnected by a tubular spacing member, and a rod having one end thereof flexibly connected with the steering knuckle of one of the steering wheels of said vehicle and the other end thereof flexibly connected with said spacing member for maintaining said rail engaging wheels parallel with the steering wheels of said vehicle whereby said rail engaging wheels when in rail contact will impart steering movement to said steering wheels.

11. The combination defined in claim 8 in which said shaft is rotatably journaled in a pair of brackets removably secured between the front axle and front springs of said vehicle.

12. The combination defined in claim 8 in which said means for holding said arms horizontal comprise a pair of helical springs, and in which said means for forcing said wheels into rail engaging position comprises a pneumatically operated roller engaging a tubular member connecting said arms for holding same in parallel position.

13. In combination with a trackless trolley road vehicle; a pair of brackets removably supported by said vehicle; a transversely disposed shaft rotatably journaled in said brackets; a bell-crank lever secured to each end of said shaft; yieldable means co-operating with the frame of said vehicle and one set of arms of said bell-crank levers for normally holding said arms substantially vertical and the other arms of said levers substantially horizontal; an arm having one end thereof pivotally connected to each of said other arms for movement transversely of said vehicle; a member having the opposite ends thereof pivotally connected to said arms for maintaining same parallel; a rail contacting wheel rotatably journaled on each of said arms; a switch in the grounding circuit between the overhead trolley and the motor of said vehicle; grounding connections between said switch and said wheels; means supported by said vehicle and operative for pressure engagement on said member for moving said arms downward against the action of said yieldable means for moving said wheels into rail contact; and means operatively connected with one of said vertical arms and said switch for operating said switch upon downward movement of said arms for effecting grounding through said wheels.

14. The combination defined in claim 13 in which said member is connected with the vehicle steering arrangement by means of a drag-link for effecting simultaneous steering movement of said rail contacting wheels and the dirigible wheels of said vehicle.

15. The combination defined in claim 13 in which said brackets each comprise a pair of plate members disposed between the front axle and front springs of said vehicle; said plate members having telescoping rolled ends providing bearings for said shaft.

16. The combination defined in claim 13 in which said means for moving said arms downwardly comprises a roller pressed by fluid means into contact with said member.

17. In combination, an electrically driven road vehicle, and a shiftable grounding apparatus carried by said vehicle; said apparatus comprising a pair of wheels designed to roll upon the parallel rails of a conventional car track and to form with the latter a return electrical circuit for the vehicle, longitudinally extending means comprising bars supported by the vehicle and trailing behind their points of connection with the vehicle, said wheels being mounted like casters in the trailing ends of said bars, and means permitting said longitudinally extending means to assume various angles with respect to the vehicle center line without resulting in an improper cooperation between the wheels and the rails.

18. In combination, an electrically driven road vehicle, and a shiftable grounding apparatus carried by said vehicle, said apparatus comprising a pair of wheels designed to roll upon parallel rails of a conventional car track and to form with the latter a return electrical circuit for the vehicle, longitudinally extending means comprising a pair of wheel-carrying bars supported by the vehicle and connected to said wheels, and means comprising a centrally pivoted cross member having its ends projecting into proximity to said bars, flexible and extensible couplings interconnecting said ends and said bars, and means yieldingly resisting the extensibility of said couplings, whereby said longitudinally extending means is permitted to assume various angles with respect to the vehicle center line without resulting in an improper cooperation between the wheels and the rails.

19. In combination with a road vehicle comprising a frame, axles, resiliently tired wheels supporting said axles, springs interconnecting said axles and frame, of an attachment secured to said vehicle to guide the same along rail tracks, said attachment comprising rail engaging wheels, a transverse shaft, means carrying said rail engaging wheels pivotally mounted on said shaft, said transverse shaft being revolubly mounted adjacent said axles.

20. In combination with a road vehicle comprising a frame, axles, resiliently tired wheels supporting said axles, springs interconnecting said axles and frame, steering mechanism for certain of said wheels; of an attachment secured to said vehicle to adapt the same for operation on tracks, said attachment comprising rail engaging guide wheels, a transverse mounting member adjacent said axles, means carrying said guide wheels and connected to said steering mechanism being pivotally mounted on said member, and means connected with said carrying means for raising and lowering the same to bring the guide wheels into engagement with the rails.

21. In combination with a road vehicle; rail engaging guide wheels to adapt same for operation along substantially parallel rails of a conventional track; carrying and adjusting means for said guide wheels to spread said wheels on rounding a curve to maintain the wheels in guiding contact with the rails.

22. A road vehicle; an attachment therefor comprising means for engagement with the substantially parallel rails of a track; means for spreading said rail engaging means on rounding a curve to maintain said means in guiding contact with the rails, said second mentioned means carrying said means to be guided thereby.

23. A road vehicle; an attachment therefor comprising means for engagement with the substantially parallel rails of a track; means for automatically spreading said rail engaging means on rounding a curve to maintain said means in guiding contact with the rails, said second mentioned means carrying said means to be guided thereby.

24. In combination, a road vehicle; shiftable rail engaging apparatus carried by said vehicle, said apparatus having a wheel designed to contact with the rail, said apparatus including means comprising wheel carrying means; and pivoted means extensibly connected thereto for automatically preventing said wheels from bindingly engaging the rails or jumping therefrom when the vehicle is slightly out of parallelism with said rails.

25. In combination, a road vehicle, and a shiftable rail engaging apparatus carried by said vehicle; said apparatus comprising a pair of wheels designed to roll upon the substantially parallel rails of a conventional track, longitudinally extending means pivotally supported by the vehicle and connected to said wheels; and cam means permitting said longitudinally extending means to assume various angles with respect to the vehicle center line to maintain proper contact of said wheels with the rails in passing around curves.

26. In combination, a road vehicle; and a shiftable rail engaging attachment carried by said vehicle, said attachment comprising a pair of wheels designed to roll upon the parallel rails of a conventional car track; longitudinally extending means pivotally supported by the vehicle and connected to said wheels; and cam means permitting said longitudinally extending means to assume various angles with respect to each other and the vehicle center line without resulting in an improper cooperation between the wheels and the rails.

27. In the combination specified in claim 26, said longitudinally extending means comprising a pair of wheel carrying bars; and said last mentioned means comprising a centrally pivoted cross member having its ends projecting into proximity to said bars, flexible and extensible couplings joining said cross member to said bars, and means yieldingly resisting the extensibility of said couplings.

WILLIAM B. FAGEOL.